US012174861B2

(12) United States Patent
Dai et al.

(10) Patent No.: US 12,174,861 B2
(45) Date of Patent: Dec. 24, 2024

(54) METHOD AND DEVICE FOR DETERMINING WHETHER SHIP ENTERS TYPHOON CIRCLE AND ELECTRONIC EQUIPMENT

(71) Applicant: COSCO SHIPPING Technology (Beijing) Co., Ltd., Beijing (CN)

(72) Inventors: Yue Dai, Beijing (CN); Yaozuo Wang, Beijing (CN)

(73) Assignee: COSCO SHIPPING Technology (Beijing) Co., Ltd., Beijing (CN)

( * ) Notice: Subject to any disclaimer, the term of this patent is extended or adjusted under 35 U.S.C. 154(b) by 782 days.

(21) Appl. No.: 17/305,984

(22) Filed: Jul. 19, 2021

(65) Prior Publication Data

US 2022/0027391 A1    Jan. 27, 2022

(30) Foreign Application Priority Data

Jul. 21, 2020    (CN) .......................... 202010702862.4

(51) Int. Cl.
*G06F 16/29* (2019.01)
*G01C 21/20* (2006.01)
*G01W 1/10* (2006.01)

(52) U.S. Cl.
CPC .......... *G06F 16/29* (2019.01); *G01C 21/203* (2013.01); *G01W 1/10* (2013.01)

(58) Field of Classification Search
None
See application file for complete search history.

(56) References Cited

FOREIGN PATENT DOCUMENTS

| CN | 101770516 A | 7/2010 |
| CN | 103308050 A | 9/2013 |

(Continued)

OTHER PUBLICATIONS

Applied Research on Marine Maneuvering Typhoon Avoidance system, Wang Jingquan et al., "Computer Simulation", Feb. 28, 2003, Issue 02 [Wang et al., "Design and Research for Intelligent Typhoon Evasion System for Ships", Computer Simulation, Feb. 28, 2003, pp. 5-10, vol. 20, No. 2 (Year: 2003).*

(Continued)

*Primary Examiner* — Aniss Chad
*Assistant Examiner* — Mahmoud M Kazimi
(74) *Attorney, Agent, or Firm* — Westman, Champlin & Koehler, P.A.

(57) ABSTRACT

A method and device are disclosed for determining whether a ship enters a typhoon circle, an electronic equipment and a computer readable medium. The method includes acquiring a typhoon trajectory information set in a preset time period, obtaining a ship position information set in a preset time period, performing data processing on each piece of typhoon trajectory information and each piece of ship information set, determining wind circle radius information corresponding to the azimuth information according to the azimuth information and the typhoon wind circle radius information, performing data processing on each piece of typhoon trajectory information and each piece of ship position information to generate a relative distance and obtain a relative distance set, and comparing each relative distance in the relative distance set with the circle radius information to generate comparison information and obtain a comparison information set. The typhoon trajectory information includes typhoon wind circle radius information.

10 Claims, 4 Drawing Sheets

(56) References Cited

FOREIGN PATENT DOCUMENTS

| | | | |
|---|---|---|---|
| CN | 104599023 A | | 5/2015 |
| CN | 105488594 A | | 4/2016 |
| CN | 105575184 A | | 5/2016 |
| CN | 108229723 A | | 6/2018 |
| CN | 108446780 A | * | 8/2018 |
| CN | 109444989 A | | 3/2019 |
| CN | 109506880 A | | 3/2019 |
| CN | 110017838 A | | 7/2019 |
| CN | 111126718 A | | 5/2020 |
| CN | 111353217 A | | 6/2020 |
| EP | 2575120 A2 | | 4/2013 |
| JP | 2000155167 A | | 6/2000 |
| JP | 2003203300 A | | 7/2003 |
| JP | 2010066073 A | | 3/2010 |
| KR | 20150078725 A | | 7/2015 |

OTHER PUBLICATIONS

Applied Research on Marine Maneuvering Typhoon Avoidance System, Wang Jingquan et al. "Computer Simulation", Feb. 28, 2003, Issue 02 [WANG et al. "Design and Research for Intelligent Typhoon Evasion System for Ships", Computer Simulation, Feb. 28, 2003, pp. 5-10, vol. 20, No. 2].

Development and Utilization of Display and Plotting System for Northwest Pacific Tropical Cyclone on Board, Wang Xiangtao et al. "Ship and Ocean Engineering", Feb. 25, 2008, Issue 1 [WANG et al. Development and Utilization of the Display and Plotting System for the Northwest Pacific Tropical Cyclone on Board, Ship and Ocean Engineering, Feb. 25, 2008, pp. 103-106, vol. 37, No. 1].

General Law of Typhoon Movement, "Maritime Meteorology", China Communications Press, Maritime Meteorology Writing Group, Jun. 30, 1981 [Trial Teaching Materials for Higher Education, Maritime Meteorology: General Law of Typhoon Movement, China Communications Press, Jun. 30, 1981, pp. 91-92].

New Exploration of Technical Method for Ship to Avoid Typhoon, Lin Mingzhi et al. Meteorological Science and Technology, Dec. 30, 1999, Issue 04 [Lin et al. "New Exploration of Technical Method for Ship to Avoid Typhoon", Meteorological Science and Technology, Dec. 30, 1999, pp. 49-53, No. 4].

First Office Action in corresponding Chinese application No. 202010702862.4 dated Oct. 27, 2023.

Second Office Action in corresponding Chinese application No. 202010702862.4 dated Jan. 15, 2024.

* cited by examiner

METHOD AND DEVICE FOR DETERMINING WHETHER SHIP ENTERS TYPHOON CIRCLE AND ELECTRONIC EQUIPMENT

CROSS REFERENCE TO RELATED APPLICATION(S)

This patent application claims the benefit and priority of Chinese Patent Application No. 202010702862.4, filed on Jul. 21, 2020, the disclosure of which is incorporated by reference herein in its entirety as part of the present application.

TECHNICAL FIELD

Embodiments of the present disclosure relate to the computer technical field, and more particularly, to a method and device for determining whether a ship enters typhoon circle and an electronic equipment.

BACKGROUND ART

Currently, ships mainly depend on the broadcast of the typhoon joint warning center to acquire typhoon circle forecast information. However, the broadcast of the typhoon joint warning center has certain timer errors. Meanwhile, it does not consider that the radius in the forward direction is greater than the influence radius behind during the movement of the typhoon. It is expected to solve the above problem, and by using the distance between and the azimuth of the typhoon center point and ship's position, and by combining wind circle radius of different quadrants, it determines whether the ship enters the typhoon wind circle.

SUMMARY

Contents of the present disclosure introduce the concepts in brief form, and these concepts will be described in detail in the following detailed description of the embodiments. The contents of the present disclosure do not intend to identify the key features or necessary features of the technical solution sought for protection, nor intend to restrict the scope of the technical solution sought for protection.

Some embodiments of the present disclosure propose a method and device for determining whether a ship enters a typhoon circle and an electronic equipment, to solve the technical problems pointed out in the above BACKGROUND ART.

In the first aspect, some embodiments of the present disclosure provide a method for determining whether a ship enters a typhoon circle; the method comprises: acquiring a typhoon trajectory information set in a preset time period, wherein the typhoon trajectory information comprises typhoon wind circle radius information; obtaining a ship position information set in a preset time period; sorting each piece of typhoon trajectory information in the typhoon trajectory information set in an ascending order according to time point, to obtain a typhoon trajectory information sequence; sorting each piece of ship position information in the ship position information set in an ascending order according to time point, to obtain a ship position information sequence, wherein the ship position information in the ship position information sequence and the typhoon trajectory information in the typhoon trajectory information have correspondence relationship; performing data processing on each piece of typhoon trajectory information and each piece of ship position information to generate azimuth information, to obtain an azimuth information set; determining wind circle radius information corresponding to the azimuth information according to the azimuth information and the typhoon wind circle radius information; performing data processing on each piece of typhoon trajectory information and each piece of ship position information to generate a relative distance and obtain a relative distance set; comparing each relative distance in the relative distance set with the circle radius information to generate comparison information, to obtain a comparison information set.

In the second aspect, embodiments of the present disclosure provide a device for determining whether a ship enters a typhoon circle, and the device comprises: a first acquisition unit, configured to acquire a typhoon trajectory information set in a preset time period, wherein the typhoon trajectory information comprises typhoon wind circle radius information; a second acquisition unit, configured to obtain a ship position information set in a preset time period; a first determination unit, configured to sort each piece of typhoon trajectory information in the typhoon trajectory information set in an ascending order according to time point, to obtain a typhoon trajectory information sequence; a second determination unit, configured to sort each piece of ship position information in the ship position information set in an ascending order according to time point, to obtain a ship position information sequence, wherein the ship position information in the ship position information sequence and the typhoon trajectory information in the typhoon trajectory have correspondence relationship; a first generation unit, configured to perform data processing on each piece of typhoon trajectory information and each piece of ship position information to generate azimuth information, thereby obtaining an azimuth information set; a third determination unit, configured to determine wind circle radius information corresponding to the azimuth information according to the azimuth information and the typhoon wind circle radius information; a second generation unit, configured to perform data processing on each piece of typhoon trajectory information and each piece of ship position information to generate a relative distance and obtain a relative distance set; a third generation unit, configured to compare each relative distance in the relative distance set with the wind circle radius information to generate comparison information, to obtain a comparison information set.

In the third aspect, embodiments of the present application provide an electronic equipment, and the electronic equipment comprises: one or more processors; a storage device, on which one or more programs are stored; when the one or more programs are executed by the one or more processors, the one or more processors implement the method described according to any one of the implementations in the first aspect.

In the fourth aspect, embodiments of the present disclosure provide a computer readable medium on which computer programs are stored, wherein the programs implement the method described according to any one of the implementations in the first aspect.

An embodiment of the above embodiments of the present disclosure has the following advantageous effects: first, it can correctly determine the azimuth information of the ship with respect to the typhoon and the information on relative distance between the ship and the typhoon by acquiring the typhoon trajectory information and the ship position information within a preset time period. Thus, it can obtain information on comparison between the distance from the ship to the typhoon and the typhoon wind circle radius.

Therefore, the comparison information can be notified to the ship at sea by a display screen or in a broadcast form to avoid encounters with the typhoon.

BRIEF DESCRIPTION OF THE DRAWINGS

The above and other features, advantages, and aspects of the embodiments of the above disclosure can be more obvious by combining the accompanying drawings and by referring to the following implementations. Throughout the accompanying drawings, the same or similar reference signs denote the same or similar elements. It should be understood that the accompanying drawings are illustrative, and the elements ant components are not necessarily drawn to scale.

DETAILED DESCRIPTION OF THE EMBODIMENTS

The following will describe the embodiments of the present disclosure by referring to the accompanying drawings in great detail. Though the accompanying drawings disclose some embodiments of the present disclosure, it should be understood that the present disclosure can be implemented in various forms, and should not be implemented as being restricted to the embodiments described herein. On the contrary, providing these embodiments is to understand the present disclosure more thoroughly and completely. It should be understood that the accompanying drawings and the embodiments of the present disclosure are merely for illustration, rather than restricting the protection scope of the present disclosure.

It should be explained additionally that for ease of description, the accompanying drawings merely illustrate the parts related to the invention. The embodiments and the features in the embodiments of the present disclosure can be combined with each other when they do not conflict.

It should be noted that concepts of "the first", "the second", and "the third", etc., mentioned in the present disclosure are merely to distinguish different devices, modules, or units, rather than restricting the sequence of the functions executed by these devices, modules, or units, or mutual independence.

It should be noted that "one", "more" mentioned in the present disclosure is schematic, rather than restrictive; those skilled in the art should understand that they should be understood as "one or more" unless clearly stated otherwise in the context.

The name of the messages or information interacted by the plural devices in the implementation of the present disclosure are merely for illustrative purpose, rather than restricting the scopes of the message or information.

The following will describe in great detail the present disclosure by referring to the accompanying drawings and by combining the embodiments.

Figure 1:
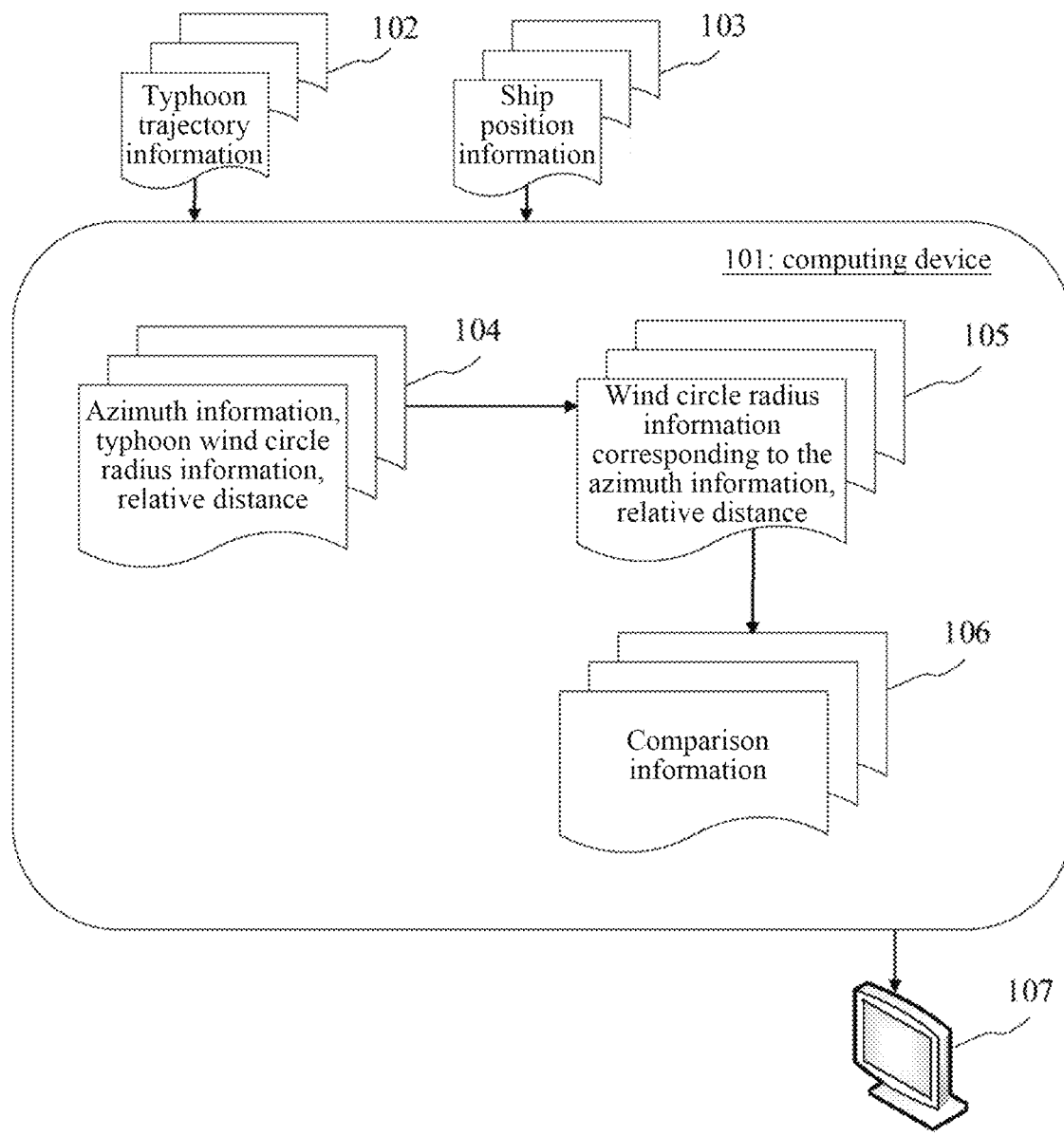
FIG. 1 is a schematic view of an application scenario of the method for determining whether a ship enters a typhoon circle according to some embodiments of the present disclosure.

FIG. 1 is a schematic view of an application scenario of the method for determining whether a ship enters a typhoon circle according to some embodiments of the present disclosure.

As shown in FIG. 1, first, computing device 101 determines azimuth information, typhoon circle radius information, and relative distance 104 according to typhoon trajectory information 102 and the ship position information 103. Then, the computing device 101 may perform data processing on the azimuth information, typhoon wind circle radius information, and relative distance 104 to obtain the wind circle radius information corresponding to the azimuth ant relative distance 105. Still then, the computing device 101 can determine comparison information 106 according to the wind circle radius information corresponding to the azimuth ant relative distance 105. Finally, in some optional implementation of some embodiments, the computing device 101 may output the comparison information 106 to the display screen 107.

It should be noted that the above computing device 101 may be hardware, or software. When the computing device is hardware, it can be implemented as a distributed cluster formed of a plurality of servers or terminal devices, or may be implemented as a single server or a single terminal device. When the computing device is implemented as software, it can be installed on the above listed hardware devices. It can be implemented as, for example, a plurality of software or software modules for providing distributed services, or be implemented as a single software or software module, which is not specifically defined here.

It should be understood that the number of user device information in FIG. 1 is merely schematic. According to implementation requirements, it may have any number of user device information.

Figure 2:
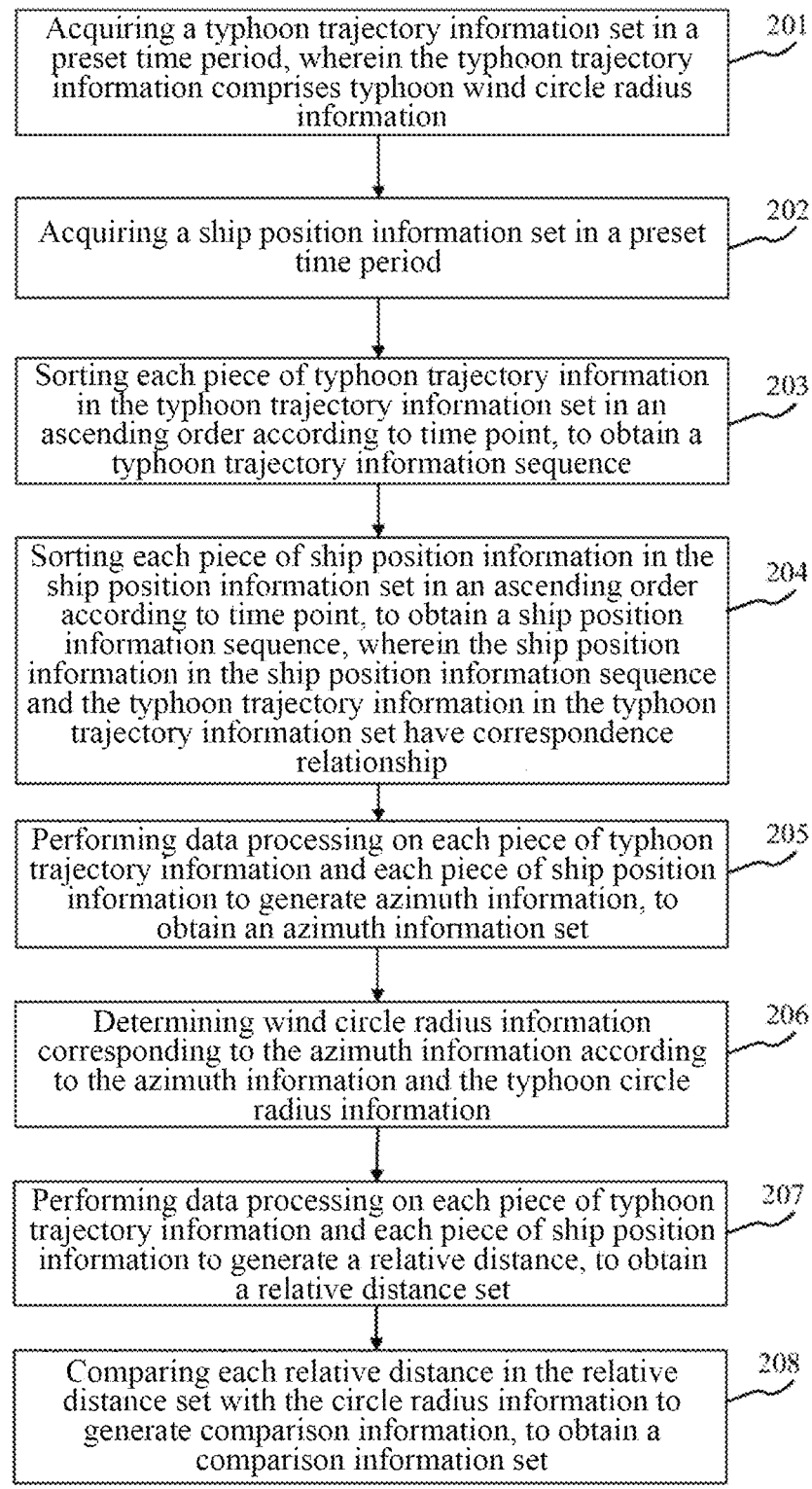
FIG. 2 is a flow chart of some embodiments of the method for determining whether a ship enters a typhoon circle according to some embodiments of the present disclosure.

Continue to refer to FIG. 2, it shows flow 200 of some embodiments of the method for determining whether a ship enters a typhoon circle according to the present disclosure. The above method for determining whether a ship enters a typhoon circle comprises the following steps:

Step 201: acquiring a typhoon trajectory information set in a preset time period.

In some embodiment, the execution body (e.g., the computing device 101 as shown in FIG. 1) of the method for determining whether a ship enters in a typhoon circle may acquire the typhoon trajectory information set in a preset time period from the terminal in a wired connection manner or a wireless connection manner, wherein the above typhoon trajectory information comprises typhoon wind circle radius information. It should be pointed out that the above wireless connection manner may include but is not limited to 3G/4G/5G connection, WiFi connection, Bluetooth connection, WiMAX connection, Zigbee connection, UWB (ultra wideband) connection, and other wireless connection manners which are currently known or to be developed in future.

As an example, the above execution body may issue an application for acquiring the typhoon trajectory information set in a preset time period to the database through network; after the database receives the application, it transmits the typhoon trajectory information set to the above execution body through network. The typhoon trajectory information set may include but is not limited to at least one of the follows: typhoon wind direction information, typhoon wind speed information, and typhoon position information.

Step 202: acquiring a ship position information set in a preset time period.

In some embodiments, the above execution body acquires the ship position information set in a preset time period from the terminal in a wired connection manner or a wireless connection manner.

As an example, the above execution body may make an application for acquiring the ship position information set in a preset time period to the database through network; the database transmits the ship position information set to the above execution body through network after receiving the application. The ship position information set may include but is not limited to at least one of the follows: ship latitude information and ship longitude information.

Step 203: sorting each piece of typhoon trajectory information in the typhoon trajectory information set in an ascending order according to time point, to obtain a typhoon trajectory information sequence.

In some embodiments, the above execution body may sorting each piece of typhoon trajectory information in the acquired typhoon trajectory information set in an ascending order according to time point, to obtain a sorted typhoon trajectory information sequence.

As an example, the typhoon trajectory information set in the preset time period may be "13:05, typhoon latitude 10°, typhoon longitude 15°; 13:10, typhoon longitude 11°, typhoon latitude 15°; 13:00, typhoon latitude 9°, typhoon longitude 150". By sorting the typhoon information set, we can obtain "13:00, typhoon latitude 9°, typhoon longitude 15°; 13:05, typhoon latitude 10°, typhoon longitude 15°; 13:10, typhoon longitude 11°, typhoon latitude 15°".

Step 204: sorting each piece of ship position information in the ship position information set in an ascending order according to time point, to obtain a ship position information sequence.

In some embodiments, the execution body may sort each piece of ship position information in the acquired ship position information set in an ascending order according to time point, to obtain a sorted ship position information sequence, wherein the ship position information in the ship position information sequence and the typhoon trajectory information in the typhoon trajectory have correspondence relationship.

As an example, the ship position information set in the preset time period may be "13:05, ship latitude 20°, ship longitude 25°; 13:10, ship longitude 21°, typhoon latitude 25°; 13:00, ship latitude 19°, ship longitude 25°". By sorting the typhoon information set, we can obtain "13:00, ship latitude 19°, ship longitude 25°; 13:05, ship latitude 20°, ship longitude 25°; 13:10, ship longitude 21°, typhoon latitude 25°".

Step 205: performing data processing on each piece of typhoon trajectory information and each piece of ship position information to generate azimuth information, to obtain an azimuth information set.

In some embodiment, the execution body performs data processing on each piece of typhoon trajectory information and each piece of ship position information to generate azimuth information, to obtain an azimuth information set.

In some optional implementation of some embodiments, the above execution body may generate the azimuth information by the following steps:

First step: determining typhoon longitude and typhoon latitude according to the typhoon trajectory information.

Second step: determining ship longitude and ship latitude according to the ship position information.

Third step: inputting the typhoon longitude and the ship longitude into the following equation to get a longitude difference:

$$D_\varphi = \varphi_2 - \varphi_1.$$

Wherein, denotes a longitude difference; $\varphi_2$ denotes a typhoon longitude; $\varphi_1$ denotes ship latitude.

Fourth step: inputting the typhoon latitude and the ship latitude into the following equation to get a latitude difference:

$$D_\lambda = \lambda_2 - \lambda_1.$$

Wherein $D_\lambda$ denotes a latitude difference; $\lambda_2$ denotes typhoon latitude; $\lambda_1$ denotes ship latitude.

Fifth step: inputting the longitude difference, the latitude difference, and the typhoon longitude into the following equation to get azimuth information:

$$C = \arctan\left(\frac{D_\lambda * \cos\varphi_2}{D_\varphi}\right).$$

Wherein C denotes the azimuth; $\varphi_2$ denotes a typhoon longitude; $D_\varphi$ denotes a longitude difference.

Step 206: determining circle radius information corresponding to the azimuth information according to the azimuth information and the typhoon circle radius information.

In some embodiments, the execution body may determine wind circle radius information corresponding to the azimuth information according to the azimuth information and the typhoon wind circle radius information.

In some optional implementation of some embodiments, the execution body may determine the circle radius information corresponding to the azimuth information by the following steps:

First step: determining a northeast radius of the circle, a southeast radius of the circle, a southwest radius of the circle, and a northwest radius according to the typhoon wind circle radius information.

Second step: obtaining wind circle radius information corresponding to the azimuth information by the following equation based on the azimuth information:

$$r(\theta) = \begin{cases} r_{NE}, & 0° \leq \theta < 90° \\ r_{SE}, & 90° \leq \theta < 180° \\ r_{SW}, & 180° \leq \theta < 270° \\ r_{NW}, & 270° \leq \theta < 360° \end{cases}.$$

Wherein, $r(\theta)$ denotes the wind circle radius corresponding to the azimuth, and $\theta$ denotes the azimuth, $r_{NE}$ denotes the northeast radius of the wind circle, $r_{SE}$ denotes the southeast radius of the wind circle, $r_{SW}$ denotes the southwest radius of the wind circle, and $r_{NW}$ denotes the northwest radius of the wind circle.

As an example, the azimuth information may be "30°". The northeast radius of the wind circle may be "10 km". The southeast radius of the wind circle may be "11 km". The southwest radius of the wind circle may be "9 km". The above execution body gets that the wind circle radius information corresponding to the azimuth information is "southeast radius is 10 km".

Step 207: performing data processing on each piece of typhoon trajectory information and each piece of ship position information to generate a relative distance, to obtain a relative distance set.

In some embodiments, the execution body performs data processing on each piece of typhoon trajectory information and each piece of ship position information to generate relative distances, and obtain a relative distance set.

In some optional implementation of some embodiments, the execution body may input the longitude difference and the azimuth information into the following equation to generate a relative distance:

$$S = D_\varphi \cdot \sec C.$$

Wherein S denotes a relative distance, C denotes the azimuth, and denotes a longitude difference.

As an example, the longitude difference may be "10°"; the azimuth may be "60°", and then the relative distance is "20 km".

Step 208: comparing each relative distance in the relative distance set with the circle radius information to generate comparison information, to obtain a comparison information set.

In some embodiments, the execution body may compare each relative distance in the relative distance set with the circle radius information to generate comparison information, and to obtain a comparison information set.

In some optional implementation of some embodiments, the execution body may generate comparison information by the following steps:

First step: selecting a relative distance greater than the wind circle radius from the relative distance set as first comparison information, to obtain a first comparison information set.

Second step: selecting a relative distance not greater than the wind circle radius from the relative distance set as second comparison information, to obtain a second comparison information set.

Third step: merging the first comparison information set and the second comparison information set to get a comparison information set.

As an example, the relative distance set may be "10 km, 9 km, 11 km, 12 km". The wind circle radius is "10 km". It can be obtained that the first comparison information set is "11 km, 12 km", and the second comparison information set "10 km, 9 km". The execution body may obtain that the comparison information set is "12 km, 11 km; 10 km, 9 km", wherein the execution body can determine that the ship does not enter the typhoon circle by using the first comparison information set. The execution body can determine that the ship enters the typhoon circle by using the second comparison information set.

In some optional implementation of some embodiments, the execution body may control the communication connected display device to display the above comparison information set, for the operating device to control the ships at sea based on the above comparison information set.

An embodiment of the respective embodiments of the present disclosure has the following advantageous effects: first, it can correctly determine the azimuth information of the ship with respect to the typhoon, and the information on relative distance information of the ship with respect to the typhoon by acquiring the typhoon trajectory information and the ship position information in a preset time period. Thus, the comparison information of the distance from the ship to the typhoon and the typhoon circle radius can be obtained. Accordingly, the comparison information can be notified to the ship at sea by a display screen or in a broadcast form to avoid encounters with the typhoon.

Figure 3:
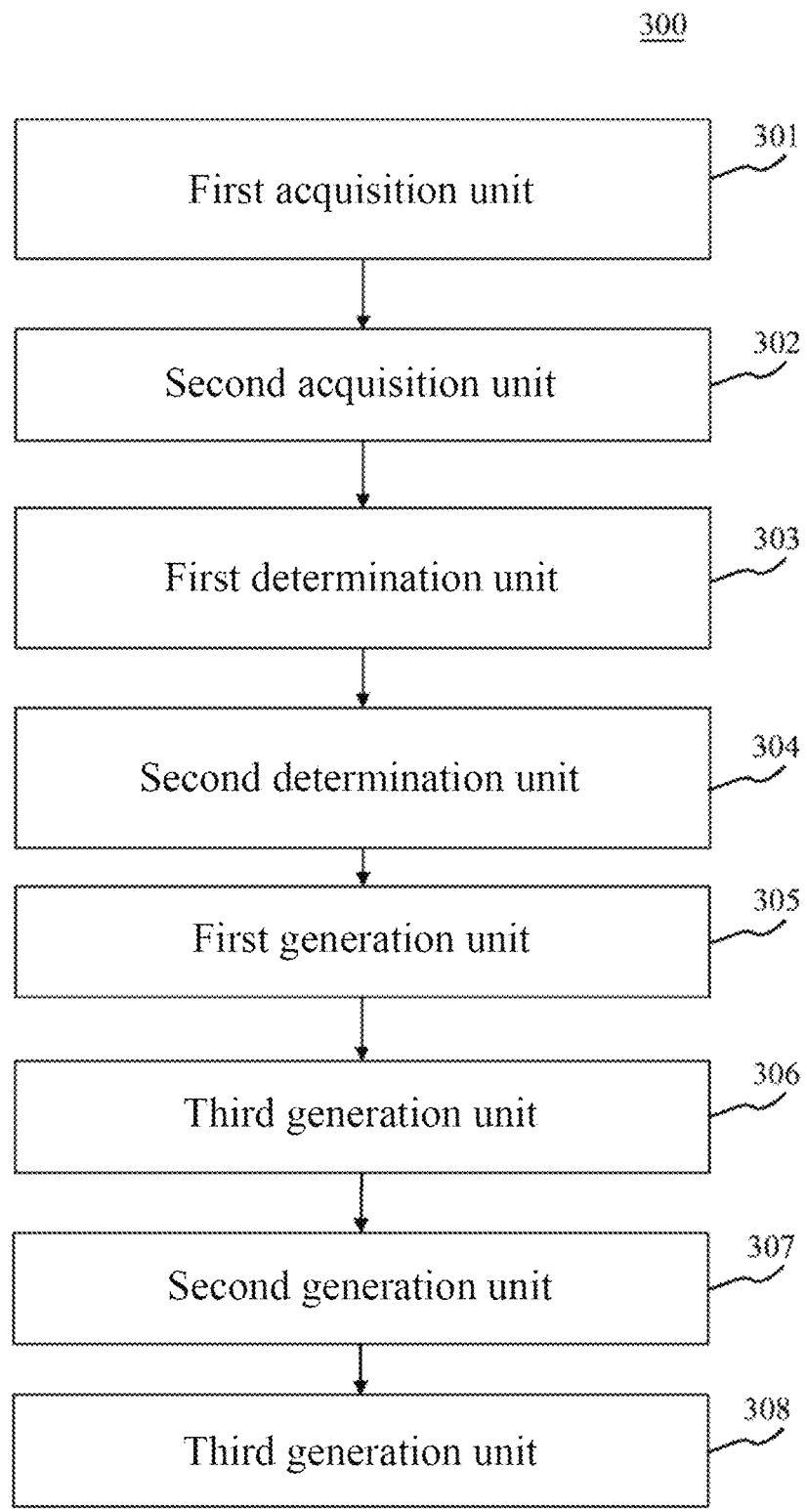
FIG. 3 is a flow chart of some embodiments of the device for determining whether a ship enters a typhoon circle according to some embodiments of the present disclosure.

By further referring to FIG. 3, as an implementation of the above method of the above accompanying drawings, the present disclosure provides some embodiments of the device for determining whether the ship enters the typhoon circle, and the device embodiments correspond to the method embodiments of FIG. 2, and the device can be specially applied into various electronic equipments.

As shown in FIG. 3, the typhoon trajectory prediction device 300 of some embodiments comprises: a first acquisition unit 301, a second acquisition unit 302, a first determination unit 303, a second determination unit 304, a first generation unit 305, a third determination unit 305, a second generation unit 306, a third generation unit 308, wherein the first acquisition unit 301 is configured to acquire a typhoon trajectory information set within a preset time period, wherein the above typhoon trajectory information comprises typhoon wind circle radius information. A second acquisition unit 302 is configured to acquire a ship position information set in a preset time period. A first determination unit 303 is configured to sorting each piece of the typhoon trajectory information in the typhoon trajectory information set in an ascending order according to time point, to obtain a typhoon trajectory information sequence. A second determination unit 304 is configured to sort each piece of ship position information in the ship position information set in an ascending order according to time point, to obtain a ship position information sequence, wherein the ship position information in the ship position information sequence and the typhoon trajectory information in the typhoon trajectory information sequence have correspondence relationship. A first generation unit 305 is configured to perform data processing on each piece of typhoon trajectory information and each piece of ship position information to generate azimuth information, to obtain an azimuth information set. A third determination unit 306 is configured to determine circle radius information corresponding to the azimuth information according to the azimuth information and the typhoon circle radius information. A second generation unit 307 is configured to perform data processing on each piece of typhoon trajectory information and each piece of ship position information to generate a relative distance, to obtain a relative distance set. A third generation unit 308 is configured to compare each relative distance in the relative distance set with the circle radius information to generate comparison information, to obtain a relative information set.

In some optional implementations of some embodiments, the third generation unit 308 of the typhoon trajectory prediction device 300 is further configured to: obtain a first comparison information set in response to that the relative distance in the relative distance set is greater than the circle radius as the first comparison information set; obtain a second comparison information set, in response to that the relative distance in the relative distance set is not greater than the circle radius as the second comparison information; determine a comparison information set according to the first comparison information set and the second comparison information set.

It can be understood that the units in device 300 correspond to the steps in the method described by referring to FIG. 2. Thus, the operations, features described for the method and the generated advantageous effects in the above text are also suitable for the device 300 and the units contained therein, details omitted here.

Figure 4:
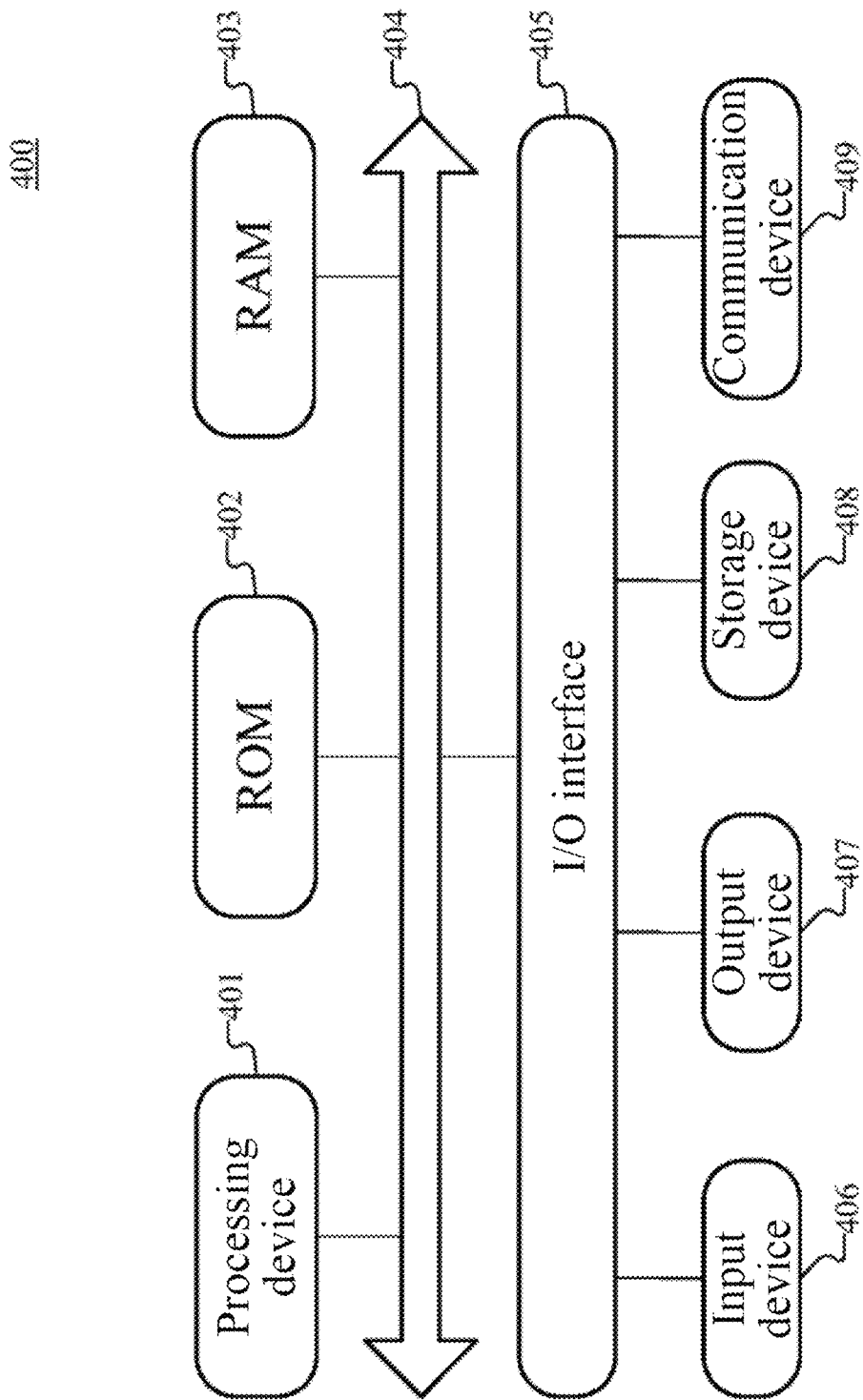
FIG. 4 is a structural schematic view of the electronic equipment suitable for implementing some embodiments of the present disclosure.

Now refer to FIG. 4, it shows a structural schematic view of the electronic equipment (e.g., the computing device 101 in FIG. 1) 400 suitable to realize some embodiments of the present disclosure. The server shown in FIG. 4 is merely an example, and should not bring any restriction to the functions and use range of the embodiments of the present disclosure.

As shown in FIG. 4, the electronic device 400 may include a processing device (e.g., a central processing unit, a graphics processing unit, etc.) 401, which can perform various proper actions and processes according to the programs stored in the read only memory (ROM) 402 or the programs loaded from the storage device 408 to the random access memory (RAM) 403. In the RAM 403, there is also stored various programs and data required by the operation of the electronic equipment 400. The processing device 401, ROM 403, and RAM 403 are mutually connected through a bus 404. The input/output (I/O) interface 405 is also connected to bus 404.

Usually, the following devices can be connected to the I/O interface 405: an input device 406 comprising, for example, a touch screen, a touch panel, a keyboard, a mouse, a camera, a microphone, an accelerometer, and a gyro, etc.; an output device 407 comprising, for example, a liquid crystal display (LCD), a loud speaker, a vibrator; a storage device 408 comprising, for example, hard and hard drive; and a communication device 409. The communication device 409 may allow the electronic device 406 to make wired or wireless communication with other devices to exchange data. Though FIG. 4 illustrates an electronic device 400 with various equipment, it should be understood that it does not require implementing or having all the illustrated equipment. It may alternatively implement or have more or less devices. Each block illustrated in FIG. 4 may represent a device, or represent plural devices as required.

In particular, according to some embodiments of the present disclosure, the process described above with reference to the flowchart may be implemented as a computer software program. For example, some embodiments of the present disclosure include a computer program product, which includes a computer program carried on a computer-readable medium, and the computer program contains program code for executing the method illustrated in the flowchart. In some such embodiments, the computer program may be downloaded and installed from the network via the communication device 409, or installed from the storage device 408, or installed from the ROM 402. When the computer program is executed by the processing device 401, the above-mentioned functions defined in the methods of some embodiments of the present disclosure are executed.

It should be noted that the above-mentioned computer-readable medium in some embodiments of the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, equipment, device, or a combination of any of the above. More specific examples of computer-readable storage media may include, but are not limited to: electrical connections with one or more wires, portable computer disks, hard disks, random access memory (RAM), read-only memory (ROM), erasable Programmable read only memory (EPROM or flash memory), optical fiber, portable compact disk read only memory (CD-ROM), optical storage device, magnetic storage device, or any suitable combination of the above. In some embodiments of the present disclosure, the computer-readable storage medium may be any tangible medium that contains or stores a program, and the program may be used by or in combination with an instruction execution system, apparatus, or device. In some embodiments of the present disclosure, the computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium, and the computer-readable signal medium can send, propagate, or transmit the program for use by or in combination with the instruction execution system, apparatus, or device. The program code contained on the computer-readable medium can be transmitted by any proper medium, including but not limited to: wire, optical cable, RF (Radio Frequency), etc., or any suitable combination of the above.

In some embodiments, the client and the server can communicate with any currently known or future to be developed network protocol such as HTTP (HyperText Transfer Protocol), and can communicate (e.g., communication network) and interconnect with digital data in any form or medium. Examples of communication networks include local area networks ("LAN"), wide area networks ("WAN"), internet (e.g., the Internet), and end-to-end networks (e.g., ad hoc end-to-end networks), as well as any currently known or future to be researched and developed networks.

The above-mentioned computer-readable medium may be included in the above-mentioned apparatus; or it may exist alone without being assembled into the electronic equipment. The computer readable medium carries one or more programs, and when the one or more programs are executed by the electronic equipment, the electronic equipment is made to: obtain typhoon trajectory information set in a preset time period, wherein the typhoon trajectory information includes typhoon wind circle radius information; obtain a ship position information set in a preset time period; sort each piece of typhoon circle trajectory information in the typhoon trajectory information set in an ascending order according to time point, to obtain a typhoon trajectory information sequence; sort each piece of ship position information in the ship position information set in an ascending order according to time point, to obtain a ship position information sequence, wherein the ship position information in the ship position information sequence and the typhoon trajectory information in the typhoon trajectory have correspondence relationship; perform data processing on each piece of typhoon trajectory information and each piece of ship position information to generate azimuth information, to obtain an azimuth information set; determine wind circle radius information corresponding to the azimuth information according to the azimuth information and the typhoon wind circle radius information; perform data processing on each piece of typhoon trajectory information and each piece of ship position information to generate a relative distance and obtain a relative distance set; compare each relative distance in the relative distance set with the circle radius information to generate comparison information, to obtain a comparison information set.

The computer program code used to perform the operations of some embodiments of the present disclosure can be written in one or more programming languages or a combination thereof. The above-mentioned programming languages include object-oriented programming languages such as Java, Smalltalk, C++, Python, and also includes conventional procedural programming languages-such as "C" language or similar programming languages. The program code can be executed entirely on the user's computer, partly on the user's computer, executed as an independent software package, executed partly on the user's computer and partly on a remote computer, or entirely executed on the remote computer or server. In the case of a remote computer, the remote computer can be connected to the user's computer through any kind of network, including a local area network ("LAN") or a wide area network (WAN), or it can be connected to an external computer (for example, using an Internet service provider to connect via the Internet).

The flowcharts and block diagrams in the accompanying drawings illustrate the architecture, functions, and operations possible to be implemented by the system, method, and computer program product according to various embodiments of the present disclosure. In this regard, each block in the flowchart or block diagram may represent a module, program segment, or part of code, and the module, program segment, or part of code contains one or more executable instructions for realizing the specified logic function. It should also be noted that, in some alternative implementations, the functions marked in the block may also occur in a different order from the order marked in the drawings. For example, two blocks represented in succession actually can be executed in parallel substantially, or sometimes they can be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations, or it can be realized by a combination of dedicated hardware and computer instructions.

The units described in some embodiments of the present disclosure may be implemented in software or hardware. The described unit can also be provided in the processor, for example, it can be described as: a processor includes a first acquisition unit, a second acquisition unit, a determination unit, a first generation unit, a second generation unit, and a third generation unit. Among them, the names of these units do not constitute restriction for the unit itself under certain circumstances. For example, the second generation unit can also be described as "a unit for performing data processing on the each piece of typhoon trajectory information and the each piece of ship position information to generate a relative distance, to obtain units of a relative distance set".

The functions described hereinabove may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Design (CPLD) and so on.

The above description is only some preferred embodiments of the present disclosure and explanations of the applied technical principles. Those skilled in the art should understand that the scope of the invention involved in the embodiments of the present disclosure is not limited to the technical solution formed of the specific combination of the above technical features, and meanwhile should also cover other technical solutions formed of any combination of the above-mentioned technical features or their equivalent features without departing from the above-mentioned inventive concept, for example, the technical solution formed of the above-mentioned features and the technical features disclosed in the embodiments of the present disclosure (but not limited to) having similar functions which are replaced with each other.

What is claimed is:

1. A method for determining whether a ship enters a typhoon circle, comprising:
    acquiring a typhoon trajectory information set in a preset time period, wherein the typhoon trajectory information comprises typhoon wind circle radius information;
    obtaining a ship position information set in a preset time period;
    sorting each piece of typhoon circle trajectory information in the typhoon trajectory information set in an ascending order according to time point, to obtain a typhoon trajectory information sequence;
    sorting each piece of ship position information in the ship position information set in an ascending order according to time point, to obtain a ship position information sequence, wherein the ship position information in the ship position information sequence and the typhoon trajectory information in the typhoon trajectory information have correspondence relationship;
    performing data processing on each piece of typhoon trajectory information and each piece of ship position information to generate azimuth information, to obtain an azimuth information set;
    determining wind circle radius information corresponding to the azimuth information according to the azimuth information and the typhoon wind circle radius information;
    performing data processing on each piece of typhoon trajectory information and each piece of ship position information to generate a relative distance and obtain a relative distance set;
    comparing each relative distance in the relative distance set with the circle radius information to generate comparison information, to obtain a comparison information set;
    outputting at least a portion of the comparison information set to a communication connected liquid crystal display;
    controlling the liquid crystal display to display at least the portion of the comparison information set in a user-perceptible format:
    controlling, based on the comparison information set, ships at sea to avoid encounters with a typhoon;
    wherein:
    performing data processing on each piece of typhoon trajectory information and each piece of ship position information to generate azimuth information comprises:
    determining typhoon longitude and typhoon latitude based on the typhoon trajectory information;
    determining ship longitude and ship latitude based on the ship position information;
    inputting the typhoon longitude and the ship longitude into the following equation to obtain a longitude difference: $D_\varphi = \varphi_2 - \varphi_1$, wherein $D_\varphi$ denotes a longitude difference, $\varphi_2$ denotes a typhoon longitude, and $\varphi_1$ denotes a ship longitude; $D_\lambda = \lambda_2 - \lambda_1$, wherein $D_\lambda$ denotes a latitude difference, $\lambda_2$ denotes a typhoon latitude, and $\lambda_1$ denotes a ship latitude; and
    inputting the longitude difference, the latitude difference, and the typhoon longitude into the following equitation to obtain azimuth information:

$$C = \arctan\left(\frac{D_\lambda * \cos\varphi_2}{D_\varphi}\right),$$

wherein C denotes azimuth, $\varphi_2$ denotes typhoon longitude, $D_{80}$ denotes a latitude difference, and $D_{100}$ denotes a longitude difference, and performing data processing on each piece of typhoon trajectory information and each piece of ship position information to generate a relative distance comprises:

generating a relative distance from the longitude difference and the azimuth information by using the following equation: $S = D_\varphi \cdot \sec C$, wherein S denotes a relative distance, C denotes the azimuth, and $D_{100}$ denotes the longitude difference.

2. An electronic equipment, comprising:
one or more processors; and
a storage device, on which one or more programs are stored;
when the one or more programs are executed by the one or more processors, the one or more processors implement the method according to claim 1.

3. A non-transitory computer readable medium on which computer programs are stored, wherein the programs implement the method according to claim 1 when being executed.

4. The non-transitory computer readable medium according to claim 3, wherein comparing each relative distance in the relative distance set with the wind circle radius information to generate comparison information comprises:

selecting a relative distance greater than the wind circle radius from the relative distance set as first comparison information, to obtain a first comparison information set;

selecting a relative distance not greater than the wind circle radius from the relative distance set as second comparison information, to obtain a second comparison information set; and merging the first comparison information set and the second comparison information set to get a comparison information set.

5. The method according to claim 1, wherein determining wind circle radius information corresponding to the azimuth according to the azimuth information and the typhoon wind circle radius information comprises:

determining a northeast radius of the wind circle, a southeast radius of the wind circle, a southwest radius of the wind circle, and a northwest radius of the wind circle according to the typhoon wind circle radius information; and obtaining wind circle radius information corresponding to the azimuth by the following equation based on the azimuth information:

$$r(\theta) = \begin{cases} r_{NE}, & 0° \leq \theta < 90° \\ r_{SE}, & 90° \leq \theta < 180° \\ r_{SW}, & 180° \leq \theta < 270° \\ r_{NW}, & 270° \leq \theta < 360° \end{cases},$$

wherein $r(\theta)$ denotes the wind circle radius corresponding to the azimuth, and $\theta$ denotes the azimuth, $r_{NE}$ denotes the northeast radius of the wind circle, $r_{SE}$ denotes the southeast radius of the wind circle, $r_{SW}$ denotes the southwest radius of the wind circle, and INw denotes the northwest radius of the wind circle.

6. The method according to claim 1, wherein comparing each relative distance in the relative distance set with the wind circle radius information to generate comparison information comprises:

selecting a relative distance greater than the wind circle radius from the relative distance set as first comparison information, to obtain a first comparison information set;

selecting a relative distance not greater than the wind circle radius from the relative distance set as second comparison information, to obtain a second comparison information set; and merging the first comparison information set and the second comparison information set to get a comparison information set.

7. A device for determining whether a ship enters a typhoon circle, the device comprising at least one processor and a communication connected liquid crystal display wherein the at least one processor is configured to:

acquire a typhoon trajectory information set in a preset time period, wherein the typhoon trajectory information comprises typhoon wind circle radius information;

obtain a ship position information set in a preset time period;

sort each piece of typhoon trajectory information in the typhoon trajectory information set in an ascending order according to time point, to obtain a typhoon trajectory information sequence;

sort each piece of ship position information in the ship position information set in an ascending order according to time point, to obtain a ship position information sequence, wherein the ship position information in the ship position information sequence and the typhoon trajectory information in the typhoon trajectory have correspondence relationship;

perform data processing on each piece of typhoon trajectory information and each piece of ship position information to generate azimuth information, thereby obtaining an azimuth information set;

determine wind circle radius information corresponding to the azimuth information according to the azimuth information and the typhoon wind circle radius information;

perform data processing on each piece of typhoon trajectory information and each piece of ship position information to generate a relative distance and obtain a relative distance set;

compare each relative distance in the relative distance set with the circle radius information to generate comparison information, thereby obtaining a comparison information set;

output at least a portion of the comparison information set to the liquid crystal display;

control the liquid crystal display to display at least the portion of the comparison information set in a user-perceptible format; and control, based on the comparison information set, ships at sea to avoid encounters with a typhoon;

wherein performing data processing on each piece of typhoon trajectory information and each piece of ship position information to generate azimuth information comprises:

determining typhoon longitude and typhoon latitude based on the typhoon trajectory information:

determining ship longitude and ship latitude based on the ship position information;

inputting the typhoon longitude and the ship longitude into the following equation to obtain a longitude difference: $D_\varphi = \varphi_2 - \varphi_1$, wherein $D_{100}$ denotes a longitude difference, $\varphi_2$ denotes a typhoon longitude, and $\varphi_1$ denotes a ship longitude;

inputting the typhoon latitude and the ship latitude into the following equation to obtain a latitude difference: $D_\lambda = \lambda_2 - \lambda_1$, wherein $D_\lambda$ denotes a latitude difference, $\lambda_2$ denotes a typhoon latitude, and $\lambda_1$ denotes a ship latitude; and inputting the longitude difference, the latitude difference, and the typhoon longitude into the following equitation to obtain azimuth information:

$$C = \arctan\left(\frac{D_\lambda * \cos\varphi_2}{D_\varphi}\right),$$

wherein C denotes azimuth, $\varphi_2$ denotes typhoon longitude, $D_{80}$ denotes a latitude difference, and $D_\varphi$ denotes a longitude difference: and performing data processing on each piece of typhoon trajectory information and each piece of ship position information to generate a relative distance comprises:
generating a relative distance from the longitude difference and the azimuth information by using the following equation: $S = D_\varphi \cdot \sec C$, wherein S denotes a relative distance, C denotes the azimuth, and $D_{100}$ denots the longitude difference.

8. The electronic equipment according to claim 2, wherein determining wind circle radius information corresponding to the azimuth according to the azimuth information and the typhoon wind circle radius information comprises:
determining a northeast radius of the wind circle, a southeast radius of the wind circle, a southwest radius of the wind circle, and a northwest radius of the wind circle according to the typhoon wind circle radius information; and
obtaining wind circle radius information corresponding to the azimuth by the following equation based on the azimuth information:

$$r(\theta) = \begin{cases} r_{NE}, & 0° \leq \theta < 90° \\ r_{SE}, & 90° \leq \theta < 180° \\ r_{SW}, & 180° \leq \theta < 270° \\ r_{NW}, & 270° \leq \theta < 360° \end{cases},$$

wherein $r(\theta)$ denotes the wind circle radius corresponding to the azimuth, and $\theta$ denotes the azimuth, $r_{NE}$ denotes the northeast radius of the wind circle, $r_{SE}$ denotes the southeast radius of the wind circle, $r_{SW}$ denotes the southwest radius of the wind circle, and INw denotes the northwest radius of the wind circle.

9. The electronic equipment according to claim 2, wherein comparing each relative distance in the relative distance set with the wind circle radius information to generate comparison information comprises:
selecting a relative distance greater than the wind circle radius from the relative distance set as first comparison information, to obtain a first comparison information set;
selecting a relative distance not greater than the wind circle radius from the relative distance set as second comparison information, to obtain a second comparison information set; and
merging the first comparison information set and the second comparison information set to get a comparison information set.

10. The non-transitory computer readable medium according to claim 3, wherein determining wind circle radius information corresponding to the azimuth according to the azimuth information and the typhoon wind circle radius information comprises:
determining a northeast radius of the wind circle, a southeast radius of the wind circle, a southwest radius of the wind circle, and a northwest radius of the wind circle according to the typhoon wind circle radius information; and
obtaining wind circle radius information corresponding to the azimuth by the following equation based on the azimuth information:

$$r(\theta) = \begin{cases} r_{NE}, & 0° \leq \theta < 90° \\ r_{SE}, & 90° \leq \theta < 180° \\ r_{SW}, & 180° \leq \theta < 270° \\ r_{NW}, & 270° \leq \theta < 360° \end{cases},$$

wherein $r(\theta)$ denotes the wind circle radius corresponding to the azimuth, and $\theta$ denotes the azimuth, $r_{NE}$ denotes the northeast radius of the wind circle, $r_{SE}$ denotes the southeast radius of the wind circle, $r_{sw}$ denotes the southwest radius of the wind circle, and $r_{NW}$ denotes the northwest radius of the wind circle.

* * * * *